(12) United States Patent
Chaudhry et al.

(10) Patent No.: US 8,627,044 B2
(45) Date of Patent: Jan. 7, 2014

(54) ISSUING INSTRUCTIONS WITH UNRESOLVED DATA DEPENDENCIES

(75) Inventors: Shailender Chaudhry, San Francisco, CA (US); Richard Thuy Van, San Jose, CA (US); Robert E. Cypher, Saratoga, CA (US); Debasish Chandra, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 626 days.

(21) Appl. No.: 12/899,369

(22) Filed: Oct. 6, 2010
(Under 37 CFR 1.47)

(65) Prior Publication Data

US 2012/0089819 A1    Apr. 12, 2012

(51) Int. Cl.
*G06F 9/30* (2006.01)

(52) U.S. Cl.
USPC .......................................... 712/216

(58) Field of Classification Search
None
See application file for complete search history.

(56) References Cited

U.S. PATENT DOCUMENTS 6,098,166 A * 8/2000 Leibholz et al. ............ 712/216

OTHER PUBLICATIONS

Chaudhry et al., "Rock: A High-Performance SPARC CMT Processor", 2009, IEEE.*
Hilton et al., "iCFP: Tolerating All-Level Cache Misses in In-Order Processors", 2008, IEEE.*
Nekkalapu et al., "A Simple Latency Tolerant Processor", 2008, IEEE.*
Barnes et al., "Beating in-order stalls with "flea-flicker" two-pass pipelining", 2003, IEEE.*
Mutlu et al., "Runahead Execution: An Alternative to Very Large Instruction Windows for Out-of-Order Processors", 2002, IEEE.*

* cited by examiner

*Primary Examiner* — Andrew Caldwell
*Assistant Examiner* — Benjamin Geib
(74) *Attorney, Agent, or Firm* — Park, Vaughan, Fleming & Dowler LLP (57) ABSTRACT

The described embodiments include a processor that determines instructions that can be issued based on unresolved data dependencies. In an issue unit in the processor, the processor keeps a record of each instruction that is directly or indirectly dependent on a base instruction. Upon determining that the base instruction has been deferred, the processor monitors instructions that are being issued from an issue queue to an execution unit for execution. Upon determining that an instruction from the record has reached a head of the issue queue, the processor immediately issues the instruction from the issue queue.

18 Claims, 7 Drawing Sheets

ISSUING INSTRUCTIONS WITH UNRESOLVED DATA DEPENDENCIES

BACKGROUND

1. Field

The described embodiments relate to computer systems. More specifically, the described embodiments relate to techniques for issuing instructions with unresolved data dependencies.

2. Related Art

Some modern microprocessors are "in-order" processors that issue instructions for execution in program order. These in-order processors typically include an issue unit that manages instruction issue as part of the enforcement of program ordering. In most of these processors, the issue unit includes a scoreboard mechanism for keeping track of dependencies between instructions in the processor. Generally, for each instruction being executed in the processor, the scoreboard holds a record that includes information about the instruction (e.g., a destination register identifier and other attributes) that the processor can use to determine when an instruction should be issued relative to other instructions.

In many of these processors, the issue unit can use a record in the scoreboard to delay the issuance of a given instruction until a prior instruction has had a chance to produce a result. In other words, the issue unit may stall the issuance of an instruction by holding the instruction at the head of a first-in-first-out issue queue until a prior instruction (upon which the instruction depends) has had a chance to output a value into its destination register. For instructions that interact with off-processor devices (e.g., a memory system or an I/O device), these delays can be dozens or even hundreds of processor clock cycles, which can cause significant delays in issuing subsequent instructions because the dependent instruction is stalled at the head of the issue queue.

To avoid some of these delays, some processor designs support the speculative execution of program code past the stalled instruction. Speculative execution involves executing instructions speculatively while preserving a pre-speculation architectural state of the processor. In these processors, the processor can discard speculative results and return to the pre-speculation architectural state if certain conditions occur during speculative execution (e.g., encountering an error/trap, a coherence violation, unavailability of processor hardware resources, executing certain types of instructions, etc.). However, if a speculative execution episode completes without encountering one of the conditions, the processor can commit the speculative results to the architectural state and continue with normal, non-speculative execution.

For example, some processors support an "execute-ahead" mode for speculatively executing instructions. In these processors, upon encountering an instruction with an unresolved data dependency while executing instructions in the non-speculative normal-execution mode, the processor defers the instruction by placing the instruction into a deferred queue and marking the destination register of the instruction "not-there" to indicate that the register is awaiting a result from a deferred instruction. The processor then transitions to the execute-ahead mode to speculatively execute subsequent instructions. During the execute-ahead mode, instructions with unresolved dependencies are deferred (and their destination registers are marked not-there), but instructions without unresolved data dependencies are executed in program order. In execute-ahead mode, instructions can be deferred if their source registers are not-there. However, these processors do not check the status of a source register until the processor is retrieving input operands in an execute unit while executing the instruction. In addition, as described above, the processor may automatically delay the issuance of an instruction for a given number of cycles to enable a prior instruction upon which the instruction depends to output a result to a destination register. Thus, an instruction that depends on prior instruction with an unresolved data dependency can be stalled at the head of the issue queue, awaiting the result of a prior instruction, despite the fact that the instruction is going to be deferred and will therefore not require the result of the prior instruction.

SUMMARY

The described embodiments include a processor that determines instructions that can be issued based on unresolved data dependencies. In an issue unit in the processor, the processor keeps a record of each instruction that is directly or indirectly dependent on a base instruction. Upon determining that the base instruction has been deferred, the processor monitors instructions that are being issued from an issue queue to an execution unit for execution. Upon determining that an instruction from the record has reached a head of the issue queue, the processor issues the instruction from the issue queue.

In some embodiments, when issuing the instruction from the issue queue, the processor issues the instruction without stalling the instruction at the head of the issue queue to await a return of a result from a prior instruction upon which the instruction depends.

In some embodiments, the processor adds an entry for each in-flight instruction in the processor to a scoreboard in the issue unit. In these embodiments, when keeping the record of each instruction that is directly or indirectly dependent on the base instruction, the processor asserts a speculative not-there indicator in each entry in the scoreboard for an instruction that is directly or indirectly dependent on the base instruction. While determining that an instruction from the record has reached the head of the issue queue, the processor determines whether the instruction is an instruction for which the speculative not-there bit was set.

In some embodiments, upon determining that the base instruction was deferred, for each entry in the scoreboard for which the speculative not-there indicator is asserted, the processor asserts a not-there indicator in the entry in the scoreboard and then clears the speculative not-there indicator. In these embodiments, to determine that the instruction is an instruction for which the speculative not-there bit was set, the processor determines that the not-there indicator is asserted in a corresponding entry in the scoreboard.

In some embodiments, the processor clears each of the not-there indicators as a corresponding instruction completes execution without being deferred.

In some embodiments, the processor clears each of the speculative not-there indicators in the scoreboard when the base instruction completes execution without being deferred.

In some embodiments, the processor selects the base instruction. The base instruction can be an instruction that modifies a value in a processor register. In addition, the base instruction can be one of: (1) a predetermined type of instruction; (2) an instruction selected from a predetermined subset of instruction types; or (3) a randomly selected instruction. Moreover, when selecting the base instruction, the processor can: (1) select an instruction randomly or pseudo-randomly; (2) select a first instruction encountered after a given time; or (3) select an instruction based on a predetermined event.

In some embodiments, the processor receives decoded instructions forwarded from a decode unit to the issue unit to be issued to one or more execution units.

In the figures, matching reference numbers refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

The following description includes a number of terms for which the definitions are generally known in the art. However, the following definition is provided to clarify the subsequent description.

The "architectural state" of a processor includes the architecturally-visible values, state, and settings that have been committed to corresponding structures on the processor. The values, state, and settings from the architectural state can be freely used by the processor to perform operations. Generally, a processor's architectural state includes the values in all processor structures, memories, registers, flags, variables, counters, and other hardware structures and software variables.

Computer System

Figure 1:
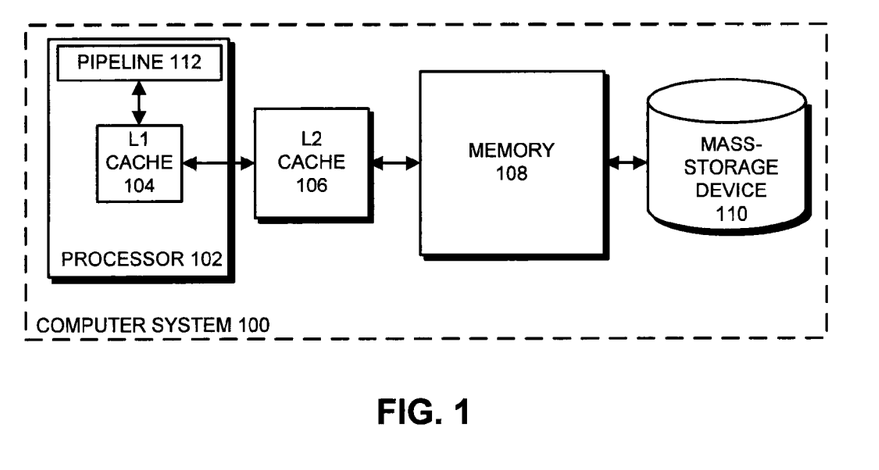
FIG. 1 presents a block diagram illustrating a computer system in accordance with the described embodiments.

FIG. 1 presents a block diagram illustrating a computer system 100 in accordance with the described embodiments. Computer system 100 includes processor 102, L2 cache 106, memory 108, and mass-storage device 110. Processor 102 includes L1 cache 104 and pipeline 112.

Processor 102 can include any device that is configured to perform computational operations. For example, processor 102 can be a central processing unit (CPU) such as a microprocessor. As another example, processor 102 can be a controller or an application-specific integrated circuit (ASIC).

Mass-storage device 110, memory 108, L2 cache 106, and L1 cache 104 are computer-readable storage mediums that collectively form a memory hierarchy in a memory subsystem that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster memories that store copies of frequently used data. For example, memory 108 can be a dynamic random access memory (DRAM) structure that is larger than L1 cache 104 and L2 cache 106, whereas L1 cache 104 and L2 cache 106 can include smaller static random access memories (SRAMs).

Computer system 100 can be incorporated into many different types of electronic devices. For example, computer system 100 can be part of a desktop computer, a laptop, netbook, or tablet computer, a server, a media player, an appliance, a cellular phone, a piece of testing equipment, a network appliance, a calculator, a personal digital assistant (PDA), a hybrid device (i.e., a "smart phone"), a guidance system, a toy, audio/video electronics, a video game system, a control system (e.g., an automotive control system), or another electronic device.

Although we use specific components to describe computer system 100, in alternative embodiments, different components can be present in computer system 100 or can be arranged differently. For example, computer system 100 can include video cards, network cards, optical drives, network controllers, I/O devices, and/or other peripheral devices that are coupled to some or all of the elements in computer system 100 using a bus, a network, or another suitable communication channel. In addition, computer system 100 may include more or fewer of the elements shown in FIG. 1. For example, computer system 100 may include additional processors 102, and the processors 102 may share some or all of L2 cache 106, memory 108, and mass-storage device 110 and/or may include some or all of their own memory hierarchy. As another example, L1 cache 104 can include a separate data cache and instruction cache.

Figure 2:
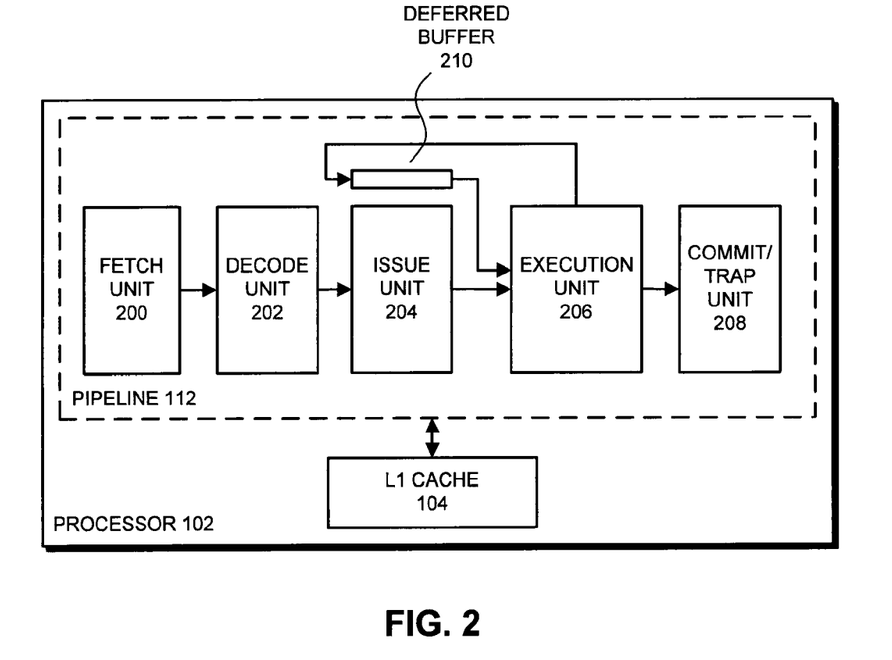
FIG. 2 presents a block diagram illustrating a processor with an expanded view of a pipeline in accordance with the described embodiments.

FIG. 2 presents a block diagram illustrating a processor 102 with an expanded view of pipeline 112 in accordance with the described embodiments. Generally, pipeline 112 is an instruction execution pipeline that includes a number of stages for executing program code. The stages in pipeline 112 are coupled in series, with the output of a given stage coupled to the input of a next stage. Instructions progress through each stage of the pipeline to complete a corresponding part of executing the instruction.

Pipeline 112 includes fetch unit 200, decode unit 202, issue unit 204, execution unit 206, and commit/trap unit 208. Fetch unit 200 fetches instructions from L1 cache 104 (or, if necessary, from other levels of the memory hierarchy) for execution. Decode unit 202 decodes the fetched instructions and prepares the instructions for execution by execution unit 206. Issue unit 204 handles the issue of decoded instructions to individual execution units in execution unit 206. Execution unit 206 executes the instructions forwarded from issue unit 204. Execution unit 206 can include one or more separate floating point execution units, integer execution units/arithmetic logic units (ALUs), branch execution units, and/or memory execution units (e.g., load/store execution units) for executing the instructions. Commit/trap unit 208 retires successfully executed instructions (i.e., commits the results to the architectural state of processor 102 and computer system 100) and handles traps/errors that arise during the execution of instructions.

Pipeline 112 also includes deferred buffer 210. In the described embodiments, if an instruction cannot be executed due to an unresolved data dependency, such as an operand that has not returned from a load operation or a translation lookaside buffer miss, processor 102 defers execution of the instruction and places the instruction into deferred buffer 210. In other words, because the instruction with the unresolved dependency cannot yet be executed by execution unit 206 due to the unresolved data dependency, the instruction is forwarded from execution unit 206 along the path shown in FIG. 2 to deferred buffer 210. When the data dependency is eventually resolved, instructions from deferred buffer 210 are forwarded to execution unit 206 to be executed in program order with respect to other deferred instructions, but not with respect to other previously executed non-deferred instructions. This process is described in more detail below with reference to FIG. 3.

Note that pipeline 112 is simplified for the purposes of illustration. In alternative embodiments, pipeline 112 can contain other stages (units), functional blocks, mechanisms, and/or circuits. Generally, the units, functional blocks, mechanisms, and/or circuits that can be used in a pipeline are known in the art and hence are not described in detail.

In addition, although described separately for clarity, in some embodiments, some of the units in pipeline 112 are included in one or more of the other units. For example, in some embodiments, fetch unit 200 includes some or all of decode unit 202 and issue unit 204. As another example, in some embodiments, decode unit 202 includes some or all of issue unit 204.

In some embodiments, processor 102 includes a checkpoint-generation mechanism (not shown). This checkpoint-generation mechanism includes one or more register files, memories, tables, lists, or other structures that facilitate preserving a copy of the architectural state of processor 102. In these embodiments, when commencing speculative execution (e.g., execution in execute-ahead mode 302, or scout mode 306 (see FIG. 3), the checkpoint-generation mechanism can perform operations to checkpoint/preserve the architectural state of processor 102. Generally, the architectural state can include copies of all processor 102's hardware structures, memories, registers, flags, variables, counters, etc., that are useful or necessary for restarting processor 102 from the pre-speculation architectural state.

Figure 3:
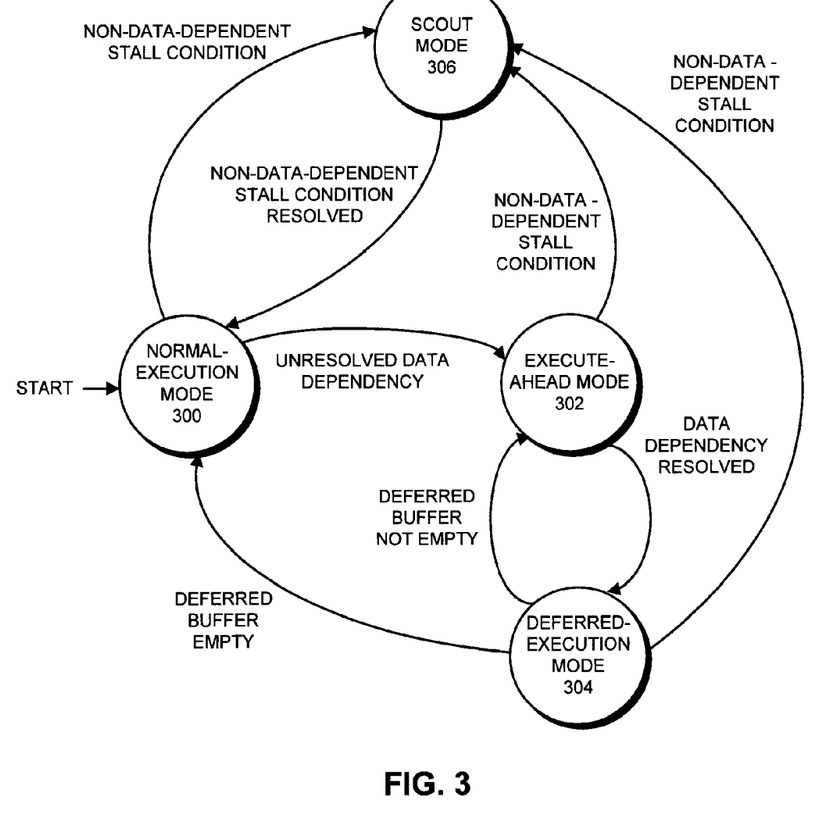
FIG. 3 presents a state diagram that includes a normal-execution mode, an execute-ahead mode, a deferred-execution mode, and a scout mode in accordance with the described embodiments.

In some embodiments, computer system 100 further includes mechanisms (functional blocks, circuits, etc.) for operating in an execute-ahead mode 302, a deferred-execution mode 304, and a scout mode 306 (see FIG. 3). Exemplary embodiments of a system that supports an execute-ahead mode and a deferred-execution mode are described in U.S. Pat. No. 7,114,060, entitled "Selectively Deferring Instructions Issued in Program Order Utilizing a Checkpoint and Multiple Deferral Scheme," by inventors Shailender Chaudhry and Marc Tremblay, which is hereby incorporated by reference to describe some mechanisms and processes of operating in execute-ahead mode and deferred-execution mode. Exemplary embodiments of a system that supports a scout mode are described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay, which is hereby incorporated by reference to describe some mechanisms and processes of operating in scout mode.

Note that, although we provide the above-described references as examples of a system that supports execute-ahead mode and deferred-execution mode, numerous other publications, conference papers, patent publications, and issued patents describe additional aspects of the execute-ahead mode and the deferred-execution mode. See, for example, U.S. Pat. No. 7,293,161, entitled "Deferring Loads and Stores When a Load Buffer or Store Buffer Fills During Execute-Ahead Mode," by inventors Shailender Chaudhry, Marc Tremblay, and Paul Caprioli, or U.S. Pat. No. 7,487,335, entitled "Method and Apparatus for Accessing Registers During Deferred Execution," by inventors Shailender Chaudhry, Syed I. Hac, Mohammed M. Rahman, and Khanh Luu.

In addition, although we provide the above-described references as examples of a system that supports scout mode, numerous other publications, conference papers, patent publications, and issued patents describe additional aspects of the scout mode. See, for example, U.S. patent publication no. 2004/0133769, entitled "Generating Prefetches by Speculatively Executing Code through Hardware Scout Threading," by inventors Shailender Chaudhry and Marc Tremblay, or U.S. patent publication no. 2004/0133767, entitled "Performing Hardware Scout Threading in a System that Supports Simultaneous Multithreading," by inventors Shailender Chaudhry and Marc Tremblay.

Speculative Execution

FIG. 3 presents a state diagram that includes a normal-execution mode 300, an execute-ahead mode 302, a deferred-execution mode 304, and a scout mode 306 in accordance with the described embodiments. Generally, the described embodiments can operate in execute-ahead mode 302 or deferred-execution mode 304 to speculatively execute program code following a data-dependent stall condition in normal-execution mode 300. In addition, the described embodiments can operate in scout mode 306 to speculatively execute program code following a non-data-dependent stall condition in normal-execution mode 300, execute-ahead mode 302, or deferred-execution mode 304. Using speculative execution, these embodiments can perform useful computational work in cases where some existing processors are stalled, waiting for a stall condition to be resolved so that subsequent instructions can be executed.

As shown in FIG. 3, processor 102 initially executes program code in normal-execution mode 300. In normal-execution mode 300, processor 102 executes instructions from program code in program order and commits results from executing instructions to the architectural state of processor 102.

Upon encountering an unresolved data dependency during execution of an instruction in normal-execution mode 300, processor 102 transitions to execute-ahead mode 302. In the described embodiments, an unresolved data dependency can include, but is not limited to: (1) a use of an operand that has not returned from a preceding load miss (e.g., an I-cache or D-cache miss); (2) a use of an operand that has not returned from a preceding translation lookaside buffer (ITLB or DTLB) miss; (3) a use of an operand that has not returned from a preceding full or partial read-after-write (RAW) from store buffer operation; and (4) a use of a result from a prior instruction (as an operand) that was subject to an unresolved data dependency.

When transitioning to execute-ahead mode 302, processor 102 generates a checkpoint that can be used to restore a pre-speculation architectural state to processor 102. Generating the checkpoint involves preserving the architectural state of processor 102 to facilitate subsequent recovery should a need arise to return to the pre-speculation state during execute-ahead mode 302, deferred-execution mode 304, or scout mode 306.

In addition, because the instruction with the unresolved data dependency cannot be executed until the data dependency is resolved, execution unit 206 forwards the instruction to deferred buffer 210. The instruction is then stored in deferred buffer 210 until the data dependency is resolved. (We call this operation "deferring" the instruction, and refer to such an instruction as a "deferred instruction.") If the instruction writes an output to a destination register, processor 102 can also set a "not there" attribute bit in the register to indicate that the register is dependent on a deferred instruction.

By deferring the instruction with the unresolved data dependency, processor 102 frees execution unit 206 to speculatively execute subsequent non-dependent instructions. Hence, in execute-ahead mode 302, processor 102 continues to execute subsequent instructions in program order. While executing subsequent instructions, any instructions that cannot be executed because of an unresolved data dependency or a dependency on a result of a prior deferred instruction are not executed, but are instead also deferred and placed in deferred buffer 210 and a not there bit is set in the destination register for the instruction (if the instruction writes an output to a destination register). Note that processor 102 can detect the dependency on the prior deferred instruction using the not there attribute bit in the processor register.

As described in more detail below, processor 102 includes mechanisms for detecting when a processor register has been marked not-there for a base instruction and issuing subsequent dependent instructions as soon as possible (i.e., as soon as these instructions reach the head/first-out position of an issue queue 404 (see FIG. 4)). In these embodiments, unlike in existing systems, issue unit 204 need not hold instructions at the head of the issue queue 404 awaiting a designated delay to give a prior instruction a chance to produce a result, but instead can immediately issue the instruction as the instruction arrives at the head of the issue queue 404.

When operating in execute-ahead mode 302, processor 102 monitors for data returns (e.g., a cache line or a DTLB translation returned to processor 102 from computer system 100 in response to a request, etc.). Upon detecting a data return, processor 102 transitions to deferred-execution mode 304.

In deferred-execution mode 304, processor 102 attempts to execute deferred instructions from deferred buffer 210 in program order. Processor 102 attempts to execute these instructions in program order with respect to other deferred instructions in deferred buffer 210 (i.e., deferred buffer 210 is a first-in-first-out buffer), but not with respect to other previously executed non-deferred instructions (and not with respect to deferred instructions executed in previous passes through deferred buffer 210). More specifically, during a deferred-execution mode episode, processor 102 issues each instruction from deferred buffer 210 to execution unit 206 in the order in which they were stored in deferred buffer 210. Note that, while issuing instructions from deferred buffer 210, processor 102 prevents the front end of pipeline 112 (i.e., instruction fetch unit 200 and instruction decode unit 202) from forwarding instructions to instruction execution unit 206, so that the only instructions executed by execution unit 206 during the deferred-execution mode 304 are issued from deferred buffer 210.

While attempting to execute each instruction from deferred buffer 210 in deferred-execution mode 304, upon encountering an instruction for which the data dependency has not yet been resolved, processor 102 re-defers execution and places the re-deferred instruction back into deferred buffer 210. (Note that processor 102 executes the other instructions that can be executed in program order with respect to each other.)

After the system completes a pass through deferred buffer 210, if deferred buffer 210 is empty, the system transitions to normal-execution mode 300. This may involve committing changes made during execute-ahead mode 302 and deferred-execution mode 304 to the architectural state of the processor, if such changes have not been already committed. Returning to normal-execution mode 300 can also involve deleting the checkpoint generated when the system moved into execute-ahead mode 302.

On the other hand, if deferred buffer 210 is not empty after the system completes a pass through deferred buffer 210, the system returns to execute-ahead mode 302 to execute instructions from the point where the execute-ahead mode 302 left off (i.e., processor 102 resumes fetching and executing instructions from the last instruction executed in execute-ahead mode 302 before the deferred-execution mode episode was started). Note that in some embodiments processor 102 does not resume execute-ahead mode 302, but instead stalls until another data return occurs (and then starts another deferred-execution mode episode).

Some embodiments also support a scout mode 306. If a non-data-dependent stall condition arises during normal-execution mode 300, execute-ahead mode 302, or deferred-execution mode 304, these embodiments can transition to scout mode 306 to speculatively execute instructions. In these embodiments, upon resolving the non-data-dependent stall condition, processor 102 restores the checkpointed architectural state and resumes operation in normal-execution mode 300. Note that restoring the checkpointed architectural state and resuming operation in normal-execution mode 300 involves overwriting or ignoring the speculative results generated during execute-ahead mode 302 and deferred-execution mode 304.

In some embodiments, although not shown in FIG. 3, upon encountering certain operating conditions and/or instructions while speculatively executing program code, processor 102 can immediately restore the most-recently generated checkpoint and resume operation in normal-execution mode 300. For example, in some embodiments, upon determining that a hardware resource is unavailable (busy, overflowed, etc.) while speculatively executing instructions, processor 102 can immediately restore the checkpoint. In some embodiments, this can happen when the store buffer overflows and/or when the deferred queue overflows.

Issue Unit

The described embodiments include a mechanism in issue unit 204 that is used to determine when a given instruction is dependent on a prior instruction that encountered an unresolved data dependency. In these embodiments, if the mechanism detects such a dependency, the mechanism can signal issue unit 204 to issue the instruction as soon as possible while still maintaining program ordering for the instruction.

Generally, in the described embodiments, an instruction can be held in the issue unit, waiting for a given number of processor clock cycles for a prior instruction upon which the instruction is dependent to produce a result before the instruction is issued. For example, an ADD instruction that follows a MUL (multiply) instruction with a dependency on the MUL instruction can be held in the issue unit for N processor clock cycles to allow the multi-cycle MUL instruction to produce a result. However, if the prior instruction (the MUL instruction in the example case) depends on a not-there register, the time spent waiting before issuing the instruction (the ADD instruction) can be wasted because the instruction will simply be deferred. In this case, the instruction does not need to await the result from the prior instruction. Therefore, the mechanism in issue unit 204 determines when a prior instruction upon which the instruction is dependent has an unresolved data dependency and signals issue unit 204 to issue the instruction as soon as possible while still maintaining program ordering.

The mechanism in issue unit 204 can include one or more hardware structures or circuits that are used for keeping track of dependencies for instructions. For example, in the described embodiments, an instruction scoreboard 402 in the issue unit can include mechanisms for keeping track of the dependencies for each instruction that is in-flight in processor 102. Note that the term "in-flight" indicates any instruction being executed in processor 102 from decoded instructions that have been forwarded to issue unit 204 for issuance to, but not including, instructions that have passed the commit/trap unit 208 and have been retired.

The described embodiments are not limited to keeping track of dependencies for single instructions; the mechanism in issue unit 204 can keep a record of all instructions with a dependency on a given instruction. For convenience, we call the record a "dependency chain" and call the given instruction, which is the first instruction in the dependency chain, the "base instruction." For example, assuming a LOAD instruction is the base instruction, the mechanism in issue unit 204 can keep track of each instruction that depends from the LOAD instruction—including instructions with dependencies on instructions that are dependent on the LOAD instructions, but that are not directly dependent on the LOAD instruction (i.e., instructions with "indirect" dependencies).

The described embodiments can use the recorded dependency chain to issue any dependent instructions as soon as possible in program order when a base instruction is determined to be subject to an unresolved data dependency. For example, assuming that the above-described LOAD instruction misses in L1 cache 104 and is sent to L2 cache 106 (and perhaps to further levels in the memory hierarchy), the LOAD instruction is deferred. The mechanism in issue unit 204 can detect that the LOAD instruction has been deferred and use the dependency chain to issue any dependent instructions as soon as possible while maintaining program order.

Figure 4:
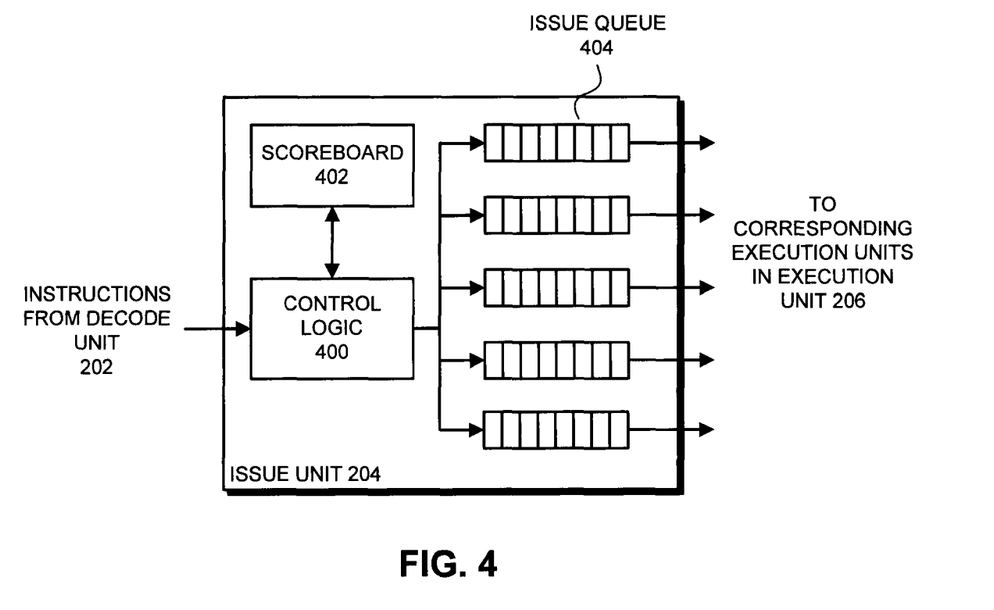
FIG. 4 presents a block diagram illustrating an expanded view of an issue unit in accordance with the described embodiments.

FIG. 4 presents a block diagram illustrating an expanded view of issue unit 204 in accordance with the described embodiments. As can be seen in FIG. 4, issue unit 204 includes control logic 400, scoreboard 402, and issue queues 404. As described above, issue unit 204 accepts decoded instructions output from decode unit 202, and forwards the decoded instructions to appropriate execution units in execution unit 206 for execution.

Control logic 400 includes one or more circuits, controllers, devices, or mechanisms for controlling the forwarding of decoded instructions from decode unit 202 to corresponding execution units in execution unit 206. In these embodiments, given a decoded instruction of a particular type, such as a branch address calculation or a floating-point operation, control logic 400 can forward the decoded instruction to the issue queue 404 associated with the corresponding execution unit. In the described embodiments, control logic 400 can include grouping/steering logic, monitoring logic, detection logic, and/or other types of logic for directing decoded instructions to an instruction queue for a corresponding execution unit and controlling the issue of the instructions.

Issue queues 404 are first-in-first-out (FIFO) buffers that include a number of entries for receiving instructions forwarded from control logic 400, and issuing instructions for execution in the order in which the instructions were received from control logic 400. For example, in some embodiments, each issue queue 404 includes two entries, each of which holds one instruction.

As described above, each issue queue 404 is used to handle instructions for a corresponding execution unit in execution unit 206. In one exemplary embodiment, from the five issue queues 404 shown in issue unit 204, two of the issue queues 404 can handle integer instructions, one of the issue queues 404 can handle floating-point instructions, another of the issue queues 404 can handle branch address calculation instructions, and the fifth issue queue 404 can handle memory instructions.

Although each issue queue 404 issues instructions in order with respect to other instructions in the same issue queue 404, the issue queue 404 may issue instructions out of order with respect to other issue queues 404. In addition, although each of the issue queues 404 handles a particular type of instructions, dependencies can occur between instructions in the issue queues 404 (i.e., an instruction in a given issue queue 404 can use the result of an instruction in a different issue queue 404 as an input). For example, a floating-point instruction in the corresponding issue queue 404 can have a dependency on an integer instruction in one of the other issue queues 404.

In the described embodiments, the issue queues 404 can issue an instruction per processor clock cycle to the corresponding execution units, and each execution unit in execution unit 206 can accept up to an instruction per cycle from the corresponding issue queue 404. Although the issue queues 404 can issue an instruction per cycle as described, control logic 400 monitors the instructions in each of the issue queues 404 to determine when an instruction should be held at the head of a given issue queue 404 and not issued because a prior instruction upon which the instruction depends has not yet produced a result.

For example, assume a CAS (compare-and-swap) instruction uses as an input a result value output from an immediately prior multi-cycle DIV (divide) instruction. In this case, control logic 400 detects that the CAS instruction is dependent on the DIV instruction and stalls the CAS instruction until the DIV instruction produces a result. When stalling the CAS instruction, control logic 400 stalls the corresponding issue queue 404 to hold the CAS instruction at the head of the issue queue 404, thereby preventing the CAS instruction and any subsequent instructions in the issue queue 404 from issuing.

Control logic 400 typically stalls an instruction in this way for a given number of cycles based on the type of prior instruction upon which the instruction is dependent. For example, assuming that a DIV instruction takes X cycles to produce a result, control logic 400 can stall subsequent dependent instructions for up to X-N cycles from the issue cycle of the DIV instruction.

Scoreboard 402 is a hardware structure that is used for keeping track of the dependencies between instructions being executed in processor 102. Scoreboard 402 includes a record structure or mechanism that includes a set of entries that can each hold a record of an instruction that is in-flight in processor 102. The record in scoreboard 402 can include an identifier of the destination register for the instruction as well as attribute information for the instruction.

The attribute information for an entry in scoreboard 402 can include an identifier of the type of instruction for which the record is being kept. Control logic 400 can use the type information to determine the number of cycles that a subsequent instruction is to be held (i.e., stalled at the head of an issue queue 404) so that the instruction can produce a result.

In addition, the attribute information can include an indication of a dependency between the instruction and an earlier instruction. For example, in some embodiments, each entry in scoreboard 402 includes an attribute field that can be used to keep track of an earlier instruction from which the output/result is used as an input for the entry's instruction. In some embodiments, this information can include an identifier such as a pointer that indicates another entry in the scoreboard 402 upon which a given entry is dependent.

The attribute information can also include a field for recording whether the associated instruction is part of a dependency chain. As described in more detail with respect to FIG. 5, starting from a base instruction, as entries for dependent instructions are added to scoreboard 402, this field can be used to keep track of a sequence or "chain" of instructions that are directly or indirectly dependent on the base instruction. If the base instruction is subsequently determined to have encountered an unresolved data dependency and been deferred (and hence the destination register for the prior instruction has been marked not-there), the described embodiments can use the records in scoreboard 402 to issue instructions in the dependency chain as soon as the instructions arrive at the head of the corresponding issue queue 404 (i.e., in program order) if they were yet to be issued.

Note that although we describe issue unit 204 using the embodiment shown in FIG. 4, in alternative embodiments, issue unit 204 can include more, fewer, or different mechanisms. Generally, issue unit 204 includes circuits, structures, and/or mechanisms for issuing decoded instructions from decode unit 202 to corresponding execution units in execution unit 206 in accordance with the operating mode of processor 102. In addition, issue unit 204 includes one or more circuits, structures, and/or mechanisms for keeping track of dependencies for in-flight instructions in processor 102 that can be used to identify any instructions that are dependent on a given base instruction so that the instructions can be issued immediately upon the base instruction being discovered to have an unresolved data dependency. Although we describe embodiments where the mechanism is in scoreboard 402, in alternative embodiments, the mechanism can be in a different location (i.e., can be in a circuit structure in control logic 400, etc.).

Recall that in existing/prior processors, the determination of whether or not an instruction attempts to read input data from a not-there register is not made until a stage in an execution unit where the instruction's input data is read from source registers. This means that in existing processors, instructions must be processed normally until that point, despite the fact that the instruction may eventually be deferred. As part of the normal processing of instructions, existing processors may stall the instructions at the head of an issue queue, awaiting the return of a result from a prior instruction upon which the instruction was dependent. Because the instruction may eventually arrive at the execution unit only to discover that one of the instruction's source registers had previously been marked not-there (and hence the instruction needs to be deferred), a stall at the issue queue awaiting the result from the prior instruction can turn out to be time wasted in executing the instruction, and can unnecessarily block subsequent instructions from proceeding to issue from the issue queue 404.

In contrast, in the described embodiments, the above-described dependency chain record enables the resolution of instructions that will be affected by deferred instructions for which the destination register will be marked not-there in issue unit 204. In other words, in these embodiments, immediately upon discovering that a base instruction has encountered an unresolved data dependency, the dependency chain record in scoreboard 402 can be used to determine each of the subsequent instructions that will encounter an unresolved data dependency caused by the deferral of the base instruction. These instructions can be issued immediately upon arriving at the head of the issue queue 404, instead of being stalled and held, waiting for a result from a prior instruction. This not only speeds execution of the instruction itself, but also prevents the instruction from unnecessarily blocking other instructions from issuing from the issue queue 404.

Scoreboard

Figure 5:
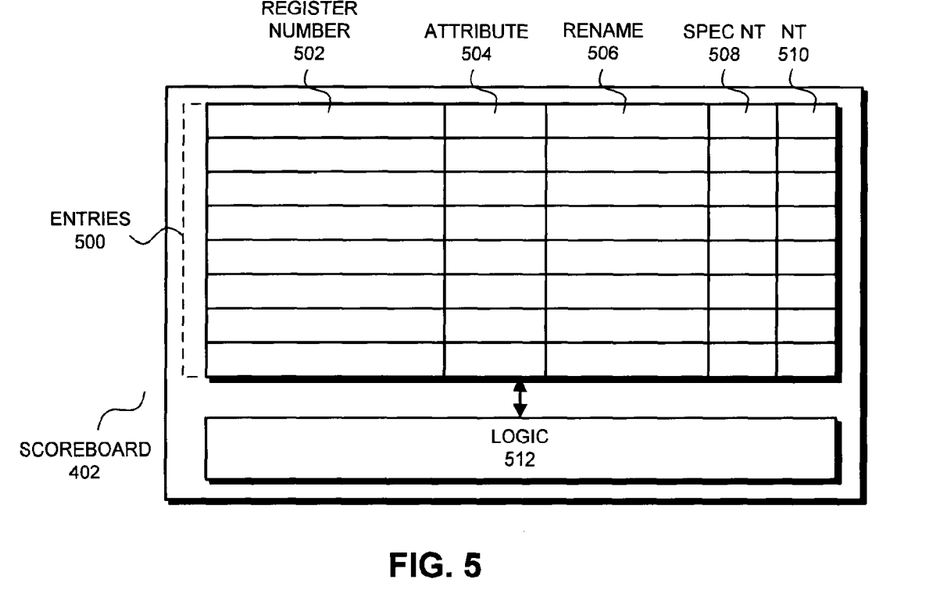
FIG. 5 presents a block diagram illustrating an expanded view of a scoreboard in accordance with the described embodiments.

FIG. 5 presents a block diagram illustrating an expanded view of scoreboard 402 in accordance with the described embodiments. As can be seen in FIG. 5, scoreboard 402 includes a set of entries 500 and logic 512. Generally, the entries 500 are used to keep track of relationships between in-flight instructions in processor 102 and logic 512 manages entries 500 (i.e., adding/removing/reading entries, etc.).

In some embodiments, entries 500 are stored in a memory structure within scoreboard 402. For example, scoreboard 402 can include a register file, a content addressable memory (CAM), and/or another type of memory structure. Generally, the described embodiments can use any type of hardware and/or software structure that enables issue unit 204 to store and access (read, compare, update, invalidate, etc.) records for in-flight instructions.

Each entry 500 includes a set of fields that are used to keep track of information about a corresponding in-flight instruction. As shown in FIG. 5, the fields include: (1) register number 502; (2) attribute 504; (3) rename 506; (4) speculative not-there (NT) 508; and (5) not-there (NT) 510.

Register number 502 holds an identifier of the destination register to which the corresponding in-flight instruction writes its result. For example, assuming that an entry is added for a LOAD instruction that writes to register "R7," the entry would indicate register R7 in the register number 502 field in the entry. Note that the register number can be a number (e.g., 7) or may be another value computed or determined by logic 512. Generally, the value stored in register number can be any value that can be used by logic 512 or issue unit 204 to identify the destination register.

Attribute 504 is used to keep track of whether a subsequent instruction is dependent on the value to be written to the destination register by the corresponding in-flight instruction. For example, assume that scoreboard 402 includes an entry 500 for a LOAD instruction writes to register "R7." If an instruction is subsequently encountered that reads from register R7, attribute 504 for the entry 500 for the LOAD instruction is updated to indicate that the value is read.

Rename 506 is used to keep track of an entry in scoreboard 402 upon which a given entry is dependent. In some embodiments, the entries in scoreboard 402 are assigned a rename value. For example, the first entry in the scoreboard can be given a value of "0," whereas the second entry is given a value of "1," etc. These values are then used in subsequent dependent entries to indicate dependence on another entry. For example, assume a LOAD instruction is placed in an entry numbered "0" by logic 512. When a subsequent ADD instruction is encountered that depends upon the LOAD instruction, rename 506 for the entry for the ADD instruction in scoreboard 402 is set to 0, thereby indicating the dependency on the LOAD instruction.

Speculative not-there (spec NT) 508 is used to keep track of instructions that depend directly or indirectly from a given base instruction. As described above, the resulting chain of dependencies can be used in the issue unit to determine instructions that are dependent on an instruction with an unresolved data dependency and can therefore be issued as soon as possible in program order. More specifically, in the described embodiments, spec NT 508 can be used to determine instructions that depend upon a previous instruction that has an unresolved data dependency. Instructions with such dependencies can be issued without being stalled a given number of cycles in the corresponding issue queue 404 awaiting a result from the previous instruction.

During operation, while executing instructions, issue unit 204 can start keeping a record of a dependency chain. In keeping the record of the dependency chain, issue unit 204 first selects an instruction as a base instruction. Generally, the base instruction can be any instruction that writes to or otherwise changes the value in a register in processor 102. For example, a memory operation instruction such as a LOAD instruction, a computational instruction such as an ADD instruction, a register manipulation instruction such as a MOV or CAS (compare-and-swap), or another instruction that alters the value in a destination register. The base instruction can be selected randomly, can be the first of a given type of instructions encountered, can be selected at or near a given time, or can be selected using another criterion.

Then, while updating an available entry in scoreboard 402 to include a record of the selected base instruction, issue unit 204 asserts (or causes logic 512 to assert) spec NT 508 for the entry. By asserting spec NT 508 for the entry, issue unit 204 establishes that a base instruction is in-flight, and that subsequent directly or indirectly dependent instructions are to have their spec NT 508 asserted so that a dependency chain from the base instruction is recorded. Note that for a "direct" dependency, a subsequent instruction ("INST2") can read the value from the destination register for the base instruction ("INSTB"). In the case of an "indirect" dependency, a later instruction (INST3) can read the value from the destination register from INST2. In this case, because INST2 is dependent on INSTB, if INSTB is determined to have an unresolved data dependency (and be deferred), INST2 will also have an unresolved data dependency, which leads to INST3 having an unresolved data dependency.

As long as the base instruction remains in-flight (i.e., before the base instruction retires), for each entry 500 updated with a record for a corresponding instruction in scoreboard 402, if that instruction is directly or indirectly dependent on the base instruction, spec NT 508 is asserted for the entry. For example, assume that the base instruction is a LOAD instruction. Further assume that the LOAD instruction is followed by a directly dependent ADD instruction and an indirectly dependent MUL instruction (e.g., where the MUL is dependent on the ADD). Along with asserting spec NT 508 for the LOAD instruction, logic 512 asserts spec NT 508 for the entries for both the ADD instruction and the MUL instruction.

If the base instruction retires without encountering an unresolved data dependency, logic 512 can deassert spec NT 508 for each of the entries for which spec NT 508 was asserted while the base instruction was in flight. Using the example above, when the LOAD instruction retires, spec NT 508 can be deasserted for the ADD and the MUL instructions. In this way, issue unit 204 clears the dependency chain when a base instruction retires. In addition, any other NT information for that entry for the base instruction can be cleared.

In some embodiments, logic 512 can use a signal returned by processor 102 to determine when the base instruction has retired. In alternative embodiments, processor 102 can include one or more monitoring mechanisms that are used to keep track of when instructions are past commit/trap unit 208 or have otherwise left the pipeline (i.e., been flushed from the pipeline, etc.).

In some embodiments, the base instruction need not completely retire before logic 512 can clear the dependency chain (i.e., deassert spec NT 508 for each affected entry). Generally, when a base instruction can no longer be deferred, the dependency chain can be cleared (and, as described below a new dependency chain can be started). For example, in some embodiments, processor 102 includes monitoring mechanisms that determine when each instruction proceeds past a stage in execute unit where the input registers are checked, in these embodiments, after checking the input registers and finding all input registers are "there," processor 102 can send a signal to logic 512 that causes logic 512 to clear a corresponding dependency chain.

On the other hand, if processor 102 encounters an unresolved data dependency and/or another condition that causes the base instruction to be deferred, processor 102 can signal logic 512 to set NT 510 for the corresponding entry 500 in scoreboard 402, thereby recording that the instruction was deferred. Because spec NT 508 is also set in the entry in scoreboard 402 for the base instruction, logic 512 searches the remaining entries and sets NT 510 for each entry for which spec NT 508 is asserted, and then deasserts spec NT 508 for the entry. By "changing" the spec NTs 508 to NTs 510 in this way, logic 512 signals issue unit 204 that the issue unit 204 can issue any of the entries for which NT 510 is set as soon as possible in program order (i.e., as soon as these instructions reach the head of the corresponding issue queue 404).

In addition to updating the NTs 510, processor 102 can clear the register scoreboard (i.e., clear information in the scoreboard which causes issue unit 204 to stall subsequent instructions at the head of the issue queue) for entries which become NT due to the merge. This prevents any of the entries for which the spec NT 508 is converted/merged to NT 510 from causing subsequent instructions to be delayed at the head of the issue queues, waiting for a prior instruction to produce a result.

In the described embodiments, the corresponding instruction need not be stalled in the issue window for a number of cycles based on a prior instruction, but instead can be issued at once. More specifically, recall that the issue queues 404 are FIFO buffers from which one instruction can issue for execution per processor clock cycle. Because one or more instructions can be queued in a given issue queue 404 for issue before an instruction from the dependency chain, one or more processor clock cycles may pass before an instruction advances to the head of the queue to be issued. However, when the instruction arrives at the head of the queue, issue unit 204 can check the entry in scoreboard 402 and determine that the instruction can be issued immediately. As described above, this can mean that issue unit 204 does not stall the instruction in the issue queue 404 a number of clock cycles before issue to allow a result to be returned from a prior instruction upon which the instruction is dependent, but instead immediately issues the instruction when the instruction reaches the head of the issue queue 404.

Issue unit 204 (logic 512) can then clear NT 510 for each entry when the instructions have been deferred. Alternatively, issue unit 204 can clear NT 510 for each entry when the instructions successfully complete execution in deferred mode. By clearing NT 510, issue unit 204 can remove the record of the dependency chain from the scoreboard when the record has been used to enable the issue of instructions as soon as the instructions were ready.

When the base instruction retires or is deferred and spec NT 508 is cleared for each of the affected entries, no dependency chain is being tracked by issue unit 204. Issue unit 204 can therefore select a new base instruction and begin the process of recording a dependency chain anew. These operations may be performed an unlimited number of times while the processor operates. Specifically, the described embodiments can: (1) select a base instruction; (2) keep track of a dependency chain from the base instruction; (3) clear the dependency chain either when base instruction retires or when spec NTs 508 are converted to NTs 510 following the deferral of the base instruction; and (4) select a new base instruction to start the process again.

Note that having a second dependency record being tracked while the first dependency record still has its NTs 510 asserted is not incorrect, because even if multiple dependency chains have NTs 510 asserted at the same time, the NTs 510 still apply to entries that are dependent on a deferred instruction.

Although we describe embodiments where only one dependency chain is kept, alternative embodiments can keep track of multiple dependency chains simultaneously. For example, FIG. 6 presents a block diagram illustrating an expanded view of scoreboard 402 in accordance with the described embodiments.

Figure 6:
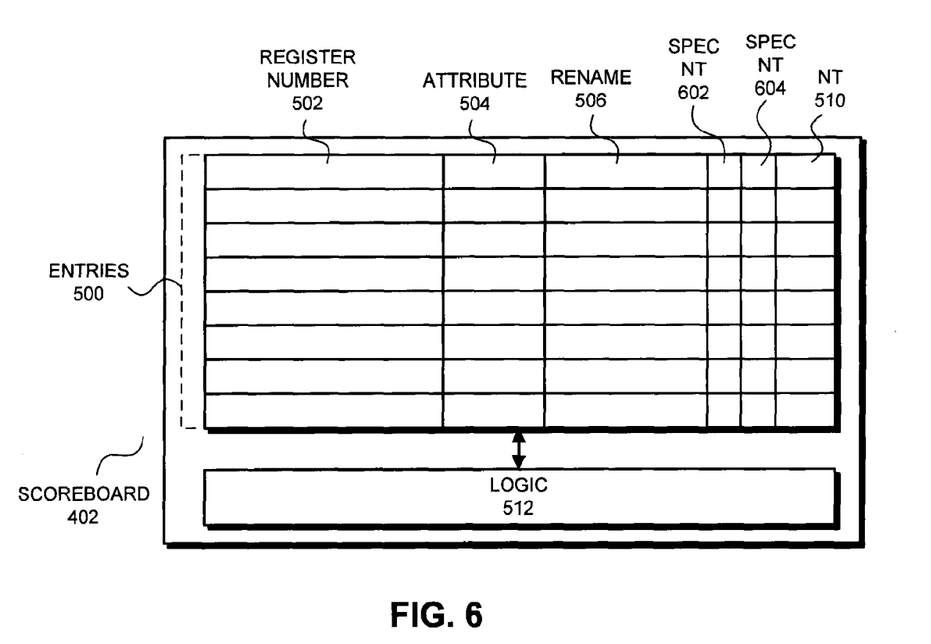
FIG. 6 presents a block diagram illustrating an expanded view of a scoreboard in accordance with the described embodiments.

As can be seen in FIG. 6, spec NT 508 has been replaced with spec NT 602 and spec NT 604. Each of the spec NTs 602 and 604 can be used in keeping a record of a separate dependency chain. In other words, issue unit 204 can select two different base instructions and logic 512 can keep track of the instructions that are directly or indirectly dependent on each of the base instructions using spec NT 602 for the first base instruction and using spec NT 604 for the second base instruction. Aside from the selection of multiple base instructions and keeping track of associated dependency chains, these embodiments otherwise function similarly to the embodiments described above with respect to FIG. 5. Although we show an embodiment in FIG. 6 that includes two spec NTs, 602 and 604, alternative embodiments can include any number of spec NTs.

In the described embodiments, the determination whether a given instruction has a dependency on a not-there register (i.e., a destination register for a deferred instruction) is made in issue unit 204. In addition, the determination can be made for all the instructions in the dependency chain at once, enabling the earlier issue of any number of dependent instructions as soon as possible while maintaining program order, an operation that was not possible in previous processors that supported execute-ahead mode 302 and deferred mode 304.

Note that although we use the fields shown in FIGS. 5 and 6 for explaining some of the operations that can be performed by the scoreboard and/or using information in the scoreboard, in alternative embodiments, more, fewer, or different fields can be present in scoreboard 402. Generally, in the described embodiments, the fields in scoreboard 402 enable the tracking of dependencies between instructions as well as the determination of one or more dependency chains for corresponding base instruction(s).

In some embodiments, entries in the scoreboard for instructions other than base instructions are handled as follows. If an instruction that is not a base instruction is determined by processor 102 to be not-there (i.e., is found to have an unresolved data dependency and is therefore deferred), issue unit 204 can update the entry for the instruction in scoreboard 402 and the entries for any dependent instructions so that they cannot cause instructions to be deferred (which can involve updating one or more of the fields in the entry to prevent instructions from being deferred). On the other hand, if an instruction that is not a base instruction is determined by processor 102 to have retired (or passed a pipeline stage where deferral is possible), processor 102 can clear the spec NT 508 and the NT 510 for the entry (e.g., set these values to zero, regardless as to whether a non-zero value was previously present in the fields of the entry or not).

Process for Issuing an Instruction with an Unresolved Data Dependency

Figure 7:
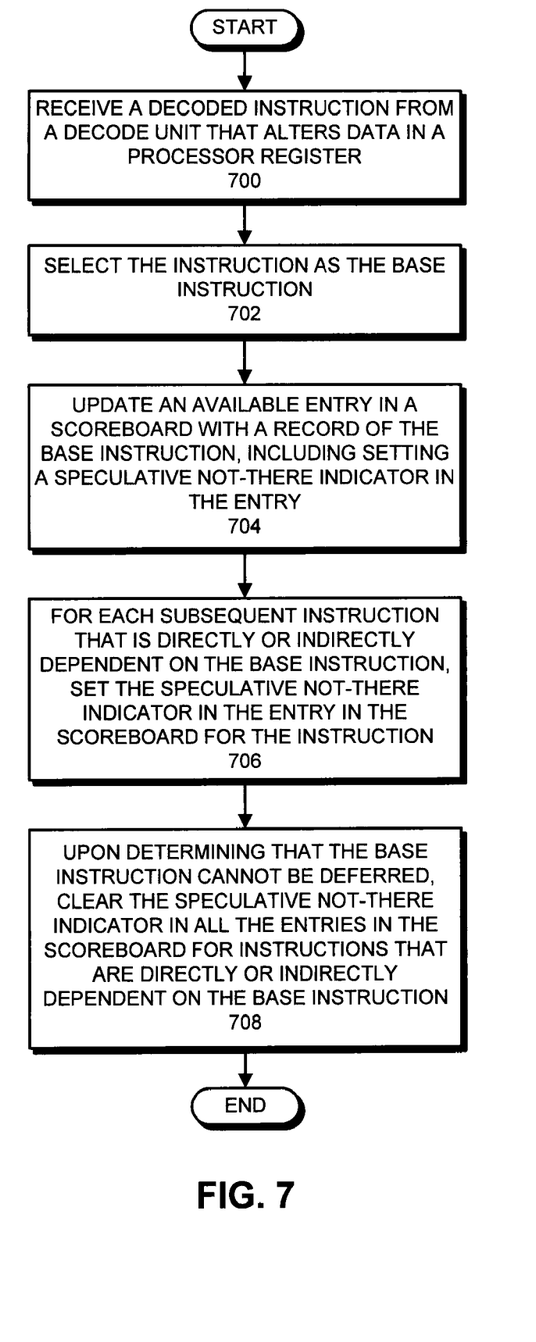
FIG. 7 presents a flowchart illustrating a process for resolving data dependencies in accordance with the described embodiments.

FIG. 7 presents a flowchart illustrating a process for resolving data dependencies in accordance with the described embodiments. The process shown in FIG. 7 starts when decode unit 202 forwards a decoded instruction that alters data in a processor register to issue unit 204 (step 700). Generally, any instruction that alters (writes, changes, or updates) the data in a processor register can be encountered; a LOAD instruction, an ADD instruction, a MOV instruction, a CMP instruction, or another instruction.

Issue unit 204 then selects the instruction as a base instruction (step 702). By selecting the instruction as the base instruction, issue unit 204 selects the instruction to be the first instruction in a dependency chain, which is a record of a sequence of instructions that are directly or indirectly dependent on the base instructions. Note that although we describe the selection of a particular instruction as a base instruction, in the described embodiments, issue unit 204 need not select a particular instruction. In some embodiments, issue unit 204 can select the first of a given type of instructions, can select an instruction at a given time (e.g., after M processor clock cycles) or after a given event, according to a hardware or software configuration switch, or as determined using another criterion. In some embodiments, when selecting an instruction, issue unit 204 can select a predetermined type of instruction, an instruction selected from a predetermined subset of instruction types, or can randomly select an instruction. In addition, in some embodiments, when selecting an instruction, issue unit 204 can select an instruction randomly or pseudo-randomly, select a first instruction encountered after a given time, or select an instruction based on a predetermined event.

Issue unit 204 then updates an entry in scoreboard 402 in issue unit 204 with a record of the base instruction, including setting a speculative not-there (spec NT 508) indicator in the entry (step 704). As described above, setting the spec NT 508 in the entry causes issue unit 204 to begin keeping track of a dependency chain starting from the base instruction.

For each subsequent instruction that is directly or indirectly dependent on the base instruction, when adding an entry to scoreboard 402, set spec NT 508 in the entry (step 706). By having the spec NT 508 set in the entry, each dependent instruction is added to the record of the dependency chain in issue unit 204.

Upon determining that the base instruction cannot be deferred, clear spec NT 508 for all the entries in the scoreboard that are directly or indirectly dependent on the base instruction (step 708). Although different embodiments can be configured in different ways, determining that the base instruction cannot be deferred generally involves determining that the base instruction has reached a stage in the pipeline where deferring the instruction is no longer possible. In some embodiments, this can mean that the instruction has passed commit/trap unit 208 and is being retired (i.e., is out of the pipeline). However, in alternative embodiments, this determination can be made in any of the other stages of the processor.

By clearing spec NT 508 for the entries in this way, issue unit 204 deletes the record of the dependency chain and clears the scoreboard to enable issue unit 204 to select a new base instruction and begin tracking a new dependency chain.

Figure 8:
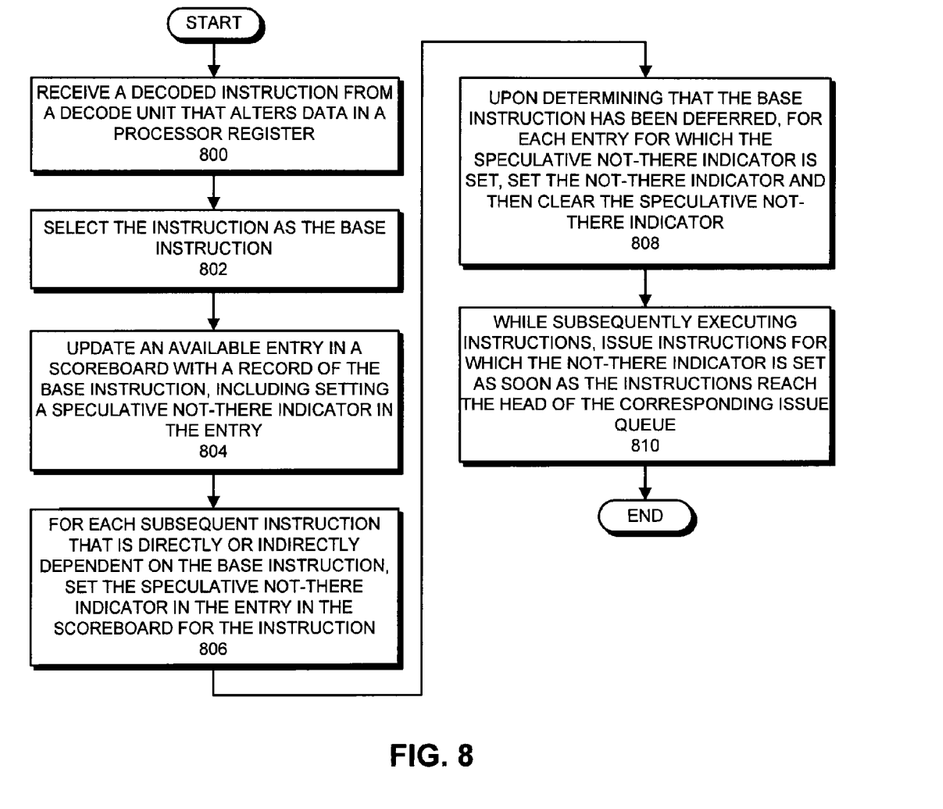
FIG. 8 presents a flowchart illustrating a process for resolving data dependencies in accordance with the described embodiments.

FIG. 8 presents a flowchart illustrating a process for resolving data dependencies in accordance with the described embodiments. The process shown in FIG. 8 starts when decode unit 202 forwards a decoded instruction that alters data in a processor register to issue unit 204 (step 800). Generally, any instruction that alters (writes, changes, or updates) the data in a processor register can be encountered; a LOAD instruction, an ADD instruction, a MOV instruction, a CMP instruction, or another instruction.

Issue unit 204 then selects the instruction as a base instruction (step 802). By selecting the instruction as the base instruction, issue unit 204 selects the instruction to be the first instruction in a dependency chain, which is a record of a sequence of instructions that are directly or indirectly dependent on the base instructions. Note that although we describe the selection of a particular instruction as a base instruction, in the described embodiments, issue unit 204 need not select a particular instruction. In some embodiments, issue unit 204 can select the first of a given type of instructions, can select an instruction at a given time (e.g., after M processor clock cycles) or after a given event, according to a hardware or software configuration switch, or as determined using another criterion. Moreover, issue unit 204 can select a predetermined type of instruction, an instruction selected from a predetermined subset of instruction types, or can randomly select an instruction.

Issue unit 204 then updates an entry in scoreboard 402 in issue unit 204 with a record of the base instruction, including setting a speculative not-there (spec NT 508) indicator in the entry (step 804). As described above, setting the spec NT 508 in the entry causes issue unit 204 to begin keeping track of a dependency chain starting from the base instruction.

For each subsequent instruction that is directly or indirectly dependent on the base instruction, when adding an entry to scoreboard 402, set spec NT 508 in the entry (step 806). By having the spec NT 508 set in the entry, each dependent instruction is added to the record of the dependency chain in issue unit 204.

Upon determining that the base instruction has encountered an unresolved data dependency (or another operating condition) and has been deferred, for each entry for which spec NT 508 is set, issue unit 204 sets NT 510 and then clears spec NT 508 (step 808). As described above, by adjusting the NTs 508 in this way, issue unit 204 records that the affected entries should issue as soon as possible while maintaining program order (e.g., immediately upon reaching the head of the corresponding issue queue 404).

While subsequently issuing instructions, issue unit 204 issues instructions for which a NT 510 is set in a corresponding entry in the scoreboard as soon as the instructions reach the head of the corresponding issue queue 404 (step 810).

Upon issuing the last of the instructions in the dependency chain, issue unit 204 can clear the NTs 510 for each of the instructions. Alternatively, issue unit 204 can clear the NTs 510 for each of the instructions at another time, such as when the instructions retire.

Note that embodiments that track multiple dependency chains may function similarly to the embodiments shown in FIGS. 6-7, but with some significant differences. Specifically, these embodiments can select at least two base instructions, and can use distinct spec NTs (e.g., spec NTs 602 and 604) to keep the dependency chain record for each base instruction. In addition, each base instruction can separately be determined not to be deferrable, and the corresponding spec NTs can be cleared or the instructions can be issued as soon as possible in program order using NTs 510.

Figure 9:
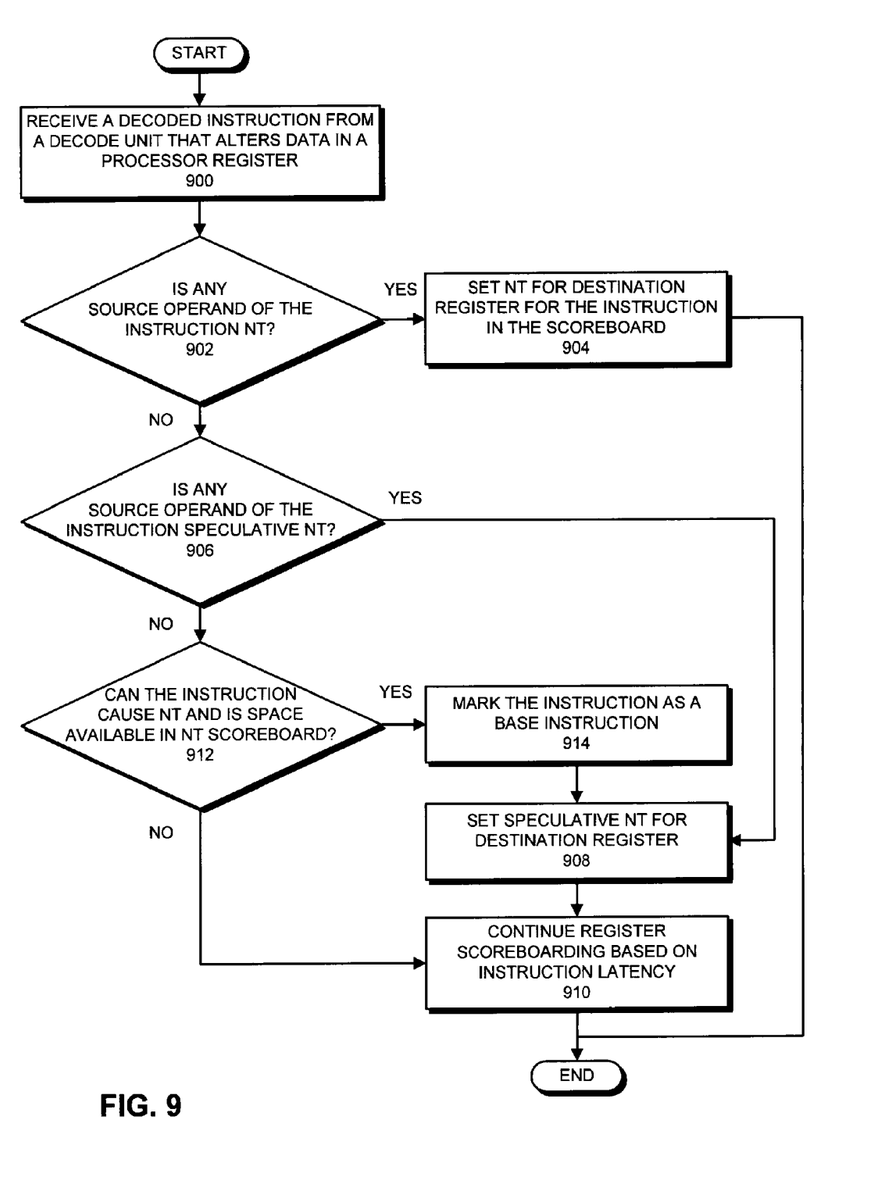
FIG. 9 presents a flowchart illustrating a process for determining a base instruction in accordance with the described embodiments.

FIG. 9 presents a flowchart illustrating a process for determining a base instruction in accordance with the described embodiments. The process shown in FIG. 9 starts when decode unit 202 forwards a decoded instruction that alters data in a processor register to issue unit 204 (step 900). Generally, any instruction that alters (writes, changes, or updates) the data in a processor register can be encountered; a LOAD instruction, an ADD instruction, a MOV instruction, a CMP instruction, or another instruction.

Issue unit 204 then determines if any source operand of the instruction is marked not-there ("NT") in scoreboard 402 (i.e., if the NT 510 is set for any source operand) (step 902). If so, issue unit 204 sets the NT 510 for the instruction in scoreboard 402 (step 904). Note that the NT is set in the event that an earlier instruction upon which the instruction is directly or indirectly dependent has been determined by processor 102 to have an unresolved dependency and been deferred (and hence the destination register for the instruction is marked NT). In addition, as described herein, a scoreboard entry can be marked not-there (i.e., have the NT 510 set for the entry) upon issue unit 204 determining that the spec NTs 508 within the scoreboard are to be merged into the NT 510.

Otherwise, if no source operand is marked NT, issue unit 204 determines if any source operand of the instruction is marked speculatively not-there ("NT") in scoreboard 402 (i.e., if the spec NT 508 is set for any source operand) (step 906). If so, issue unit 204 sets the spec NT 508 for an entry for the instruction in scoreboard 402 (step 908). Issue unit 204 then continues register scoreboarding based on instruction latency (as is described above) (step 910).

Otherwise, if none of the source operands for the instruction are marked NT or speculatively NT, the instruction is a candidate to be a base instruction. In this case, issue unit 204 determines if the instruction is to be a base instruction. Specifically, the issue unit determines if the instruction can cause an NT (i.e., if the instruction can be deferred and have it and its dependent instructions marked not-there) and if there is sufficient room to track the NT in scoreboard 402 (step 912). Note that checking if there is sufficient room involves determining if one or more of the dependency chain tracking mechanisms is available/is not currently being used to track NT for a different base instruction. If the instruction can cause an NT and space is available in scoreboard 402 for tracking a dependency chain based on the instruction, issue unit 204 marks the instruction as a base instruction (step 914). Issue unit 204 then sets the speculative NT for the destination register (step 908). Note that marking the instruction as a base instruction can involve an operation as simple as setting the speculative NT for the destination register alone (i.e., performing the operation in step 908), or can involve updating one or more processor tracking mechanisms, variables, pipeline structures, etc. to record that the instruction is the base instruction. Issue unit 204 then continues register scoreboarding based on instruction latency (as is described above) (step 910).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for issuing instructions with unresolved data dependencies in a processor, comprising:
    adding an entry for each in-flight instruction in the processor to a scoreboard;
    within an issue unit in the processor,
        keeping a record of each instruction that is directly or indirectly dependent on a base instruction by asserting a speculative not-there indicator in each entry in the scoreboard for an instruction that is directly or indirectly dependent on the base instruction; and
        upon determining that the base instruction has been deferred,
            monitoring instructions that are being issued from an issue queue to an execution unit for execution; and
            upon determining that an instruction from the record has reached a head of the issue queue, immediately issuing the instruction from the issue queue, wherein determining that the instruction from the record has reached the head of the issue queue comprises determining that the instruction from the record is an instruction for which the speculative not-there bit was set.

2. The method of claim 1, wherein immediately issuing the instruction from the issue queue includes:
    issuing the instruction without stalling the instruction at the head of the issue queue to await a return of a result from a prior instruction upon which the instruction depends.

3. The method of claim 2, wherein upon determining that the base instruction was deferred, the method further comprises:
    for each entry in the scoreboard for which the speculative not-there indicator is asserted, asserting a not-there indicator in the entry in the scoreboard and clearing the speculative not-there indicator;
    wherein determining that the instruction is an instruction for which the speculative not-there bit was set includes determining that the not-there indicator is asserted in a corresponding entry in the scoreboard.

4. The method of claim 3, wherein the method further comprises clearing each of the not-there indicators as a corresponding instruction is issued for execution.

5. The method of claim 3, wherein the method further comprises clearing each of the not-there indicators as a corresponding instruction completes execution.

6. The method of claim 2, wherein the method further comprises clearing each of the speculative not-there indicators in the scoreboard when the base instruction completes execution without being deferred.

7. The method of claim 1, wherein the method further comprises:
    selecting the base instruction, wherein the base instruction is an instruction that modifies a value in a processor register;
    wherein the base instruction is one of: a predetermined type of instruction, an instruction selected from a predetermined subset of instruction types, or a randomly selected instruction; and
    wherein selecting the base instruction includes one of: selecting an instruction randomly or pseudo-randomly, selecting a first instruction encountered after a given time, or selecting an instruction based on a predetermined event.

8. The method of claim 7, wherein the method further comprises:
    receiving decoded instructions forwarded from a decode unit to the issue unit for issue to one or more execution units.

9. A processor for issuing instructions based on unresolved data dependencies, comprising:
    an issue unit in the processor, wherein the issue unit is configured to:
        add an entry for each in-flight instruction in the processor to a scoreboard;
        keep a record of each instruction that is directly or indirectly dependent on a base instruction by asserting a speculative not-there indicator in each entry in the scoreboard for an instruction that is directly or indirectly dependent on the base instruction;
        upon determining that the base instruction has been deferred, monitor instructions that are being issued from an issue queue to an execution unit for execution; and
        upon determining that an instruction from the record has reached a head of the issue queue, immediately issue the instruction from the issue queue, wherein determining that an instruction from the record has reached the head of the issue queue includes determining that the instruction is an instruction for which the speculative not-there bit was set.

10. The processor of claim 9, wherein when immediately issuing the instruction from the issue queue, the issue unit is configured to issue the instruction without stalling the instruction at the head of the issue queue to await a return of a result from a prior instruction upon which the instruction depends.

11. The processor of claim 10, wherein upon determining that the base instruction was deferred, for each entry in the scoreboard for which the speculative not-there indicator is asserted, the issue unit is configured to assert a not-there indicator in the entry in the scoreboard and clear the speculative not-there indicator; and
    wherein when determining whether the instruction is an instruction for which the speculative not-there bit was set, the issue unit is configured to determine that the not-there indicator is asserted in a corresponding entry in the scoreboard.

12. The processor of claim 11, wherein the issue unit is configured to clear each of the not-there indicators as a corresponding instruction is issued for execution.

13. The processor of claim 11, wherein the issue unit is configured to clear each of the not-there indicators as a corresponding instruction completes execution.

14. The processor of claim 10, wherein the issue unit is configured to clear each of the speculative not-there indicators in the scoreboard when the base instruction completes execution without being deferred.

15. The processor of claim 9, wherein the issue unit is configured to select the base instruction, wherein the base instruction is an instruction that modifies a value in a processor register;
    wherein when selecting the base instruction, the issue unit is configured to select a base instruction that is one of: a predetermined type of instruction, an instruction selected from a predetermined subset of instruction types, or a randomly selected instruction; and
    wherein when selecting the base instruction, the issue unit is further configured to select a base instruction randomly or pseudo-randomly, select a first instruction encountered after a given time, or select an instruction based on a predetermined event.

16. The processor of claim 15, wherein the issue unit is further configured to receive decoded instructions forwarded from a decode unit and issue decoded instructions to one or more execution units.

17. A computer system for issuing instructions based on unresolved data dependencies, comprising:
- a processor;
- a memory coupled to the processor, wherein the memory stores instructions and data for the processor; and
- an issue unit in the processor, wherein the issue unit is configured to:
  - add an entry for each in-flight instruction in the processor to a scoreboard;
    - keep a record of each instruction that is directly or indirectly dependent on the base instruction by asserting a speculative not-there indicator in each entry in the scoreboard for an instruction that is directly or indirectly dependent on the base instruction;
    - upon determining that the base instruction has been deferred, monitor instructions that are being issued from an issue queue to an execution unit for execution; and
    - upon determining that an instruction from the record has reached a head of the issue queue, immediately issue the instruction from the issue queue, wherein determining that an instruction from the record has reached the head of the issue queue includes determining that the instruction is an instruction for which the speculative not-there bit was set.

18. The computer system of claim 17, wherein when immediately issuing the instruction from the issue queue, the issue unit is configured to issue the instruction without stalling the instruction at the head of the issue queue to await a return of a result from a prior instruction upon which the instruction depends.

* * * * *

UNITED STATES PATENT AND TRADEMARK OFFICE
CERTIFICATE OF CORRECTION

| | | |
|---|---|---|
| PATENT NO. | : 8,627,044 B2 | Page 1 of 1 |
| APPLICATION NO. | : 12/899369 | |
| DATED | : January 7, 2014 | |
| INVENTOR(S) | : Chaudhry et al. | |

It is certified that error appears in the above-identified patent and that said Letters Patent is hereby corrected as shown below:

In the Specification

In column 6, line 16, delete "Syed I. Hac," and insert -- Syed I. Haq, --, therefor.

Signed and Sealed this
Eighth Day of July, 2014

Michelle K. Lee
*Deputy Director of the United States Patent and Trademark Office*